United States Patent
Mallette

(10) Patent No.: US 7,301,118 B2
(45) Date of Patent: Nov. 27, 2007

(54) WELDING GUN WITH CONTROLLER AND METHOD FOR USING SAME

(75) Inventor: Michael P Mallette, Warren, MI (US)

(73) Assignee: Chrysler LLC, Auburn Hills, MI (US)

( * ) Notice: Subject to any disclaimer, the term of this patent is extended or adjusted under 35 U.S.C. 154(b) by 135 days.

(21) Appl. No.: 11/237,303

(22) Filed: Sep. 26, 2005

(65) Prior Publication Data

US 2007/0068906 A1 Mar. 29, 2007

(51) Int. Cl.
*B23K 11/10* (2006.01)
*B23K 37/02* (2006.01)

(52) U.S. Cl. ...................... 219/86.51; 219/89; 219/91.1

(58) Field of Classification Search ............. 219/86.51, 219/89, 91.1
See application file for complete search history.

(56) References Cited

U.S. PATENT DOCUMENTS

| | | | | |
|---|---|---|---|---|
| 2,661,599 A | * | 12/1953 | Folmer ........................ | 92/151 |
| 3,875,365 A | * | 4/1975 | Beneteau ..................... | 219/89 |
| 5,247,871 A | * | 9/1993 | Brasca et al. ................ | 91/519 |
| 5,493,093 A | * | 2/1996 | Cecil .......................... | 219/110 |
| 5,623,861 A | * | 4/1997 | Ward et al. .................. | 91/420 |
| 6,633,015 B2 | * | 10/2003 | Nguyen et al. ............... | 219/89 |
| 6,895,749 B2 | * | 5/2005 | Tohru .......................... | 60/563 |
| 2003/0154797 A1 | * | 8/2003 | Helliker et al. .............. | 73/744 |

FOREIGN PATENT DOCUMENTS

DE 35 42 069 A1 * 6/1986

* cited by examiner

*Primary Examiner*—Kevin P. Kerns
(74) *Attorney, Agent, or Firm*—Ralph E. Smith

(57) ABSTRACT

A welding gun assembly including a housing that defines a first chamber and a second chamber. The assembly also includes a first piston moveably disposed in the first chamber and a second piston moveably disposed in the second chamber. The assembly includes an intensifying rod that can move at least partially into the first chamber due to movement of the second piston within the second chamber. The assembly includes a controller with a pressure sensor operable to detect pressure within the first chamber. The controller is operable to increase pressure within the first chamber up to a predetermined extension pressure while the intensifying rod is disposed outside of the first chamber. The controller is further operable to increase pressure within the second chamber to thereby move the intensifying rod into the first chamber to thereby increase pressure within the first chamber above the predetermined extension pressure.

20 Claims, 3 Drawing Sheets

WELDING GUN WITH CONTROLLER AND METHOD FOR USING SAME

FIELD OF THE INVENTION

The present invention relates to welding guns, and more particularly, relates to a welding gun with a controller and a method for using the same.

BACKGROUND OF THE INVENTION

Resistance welding is one type of welding process in which current is passed through the parts to be welded, and in many cases, the quality of the weld can vary. For instance, in regard to resistance spot welding processes, a welding gun has electrodes that close over multiple parts and apply pressure thereto. Then, high current is passed through the electrodes to create heat, which thereby creates a weld nugget that joins the parts together. The quality of the nugget depends on the amount of heat created, the amount of time the current is applied, the amount of pressure applied to the parts by the electrodes, and the amount of time pressure is applied by the electrodes.

Many welding guns are automated in order to control these parameters. For instance, some welding guns of the prior art utilize hydraulic and/or pneumatic devices to manipulate the electrodes for applying pressure to the part. Some of these welding guns include air switches, flow controls and time delays to control movement and pressure loading of the electrodes. Some of these welding guns also include load cells, position transducers, and/or processors to detect the load transferred from the electrodes to the parts. However, these means of moving, loading, and detecting the load of the electrodes can be costly, inaccurate, and complicated to operate and maintain.

Accordingly, there remains a need for a welding gun having a more cost effective, accurate, easy to operate and maintain means of moving, loading, and detecting the load of the electrode.

SUMMARY OF THE INVENTION

The disadvantages of the prior art are overcome in the welding gun assembly of the present invention. The welding gun assembly includes a housing that defines a first chamber and a second chamber. The assembly also includes a first piston moveably disposed in the first chamber and a second piston moveably disposed in the second chamber. The assembly further includes an intensifying rod that can move at least partially into the first chamber due to movement of the second piston within the second chamber. Moreover, the assembly includes a controller with a pressure sensor operable to detect pressure within the first chamber. The controller is operable to increase pressure within the first chamber up to approximately a predetermined extension pressure while the intensifying rod is disposed outside of the first chamber. The controller is further operable to increase pressure within the second chamber to thereby move the intensifying rod at least partially into the first chamber to thereby increase pressure within the first chamber above the predetermined extension pressure.

In another aspect, the present invention is a method of welding a part with a welding gun assembly. The welding gun assembly includes a housing that defines a first chamber and a second chamber, a first piston moveably disposed in the first chamber, a second piston moveably disposed in the second chamber, and an intensifying rod that can move at least partially into the first chamber due to movement of the second piston within the second chamber. The method includes the steps of increasing pressure in the first chamber up to approximately a predetermined extension pressure while the intensifying rod is disposed outside the first chamber. The method further includes monitoring pressure within the first chamber and detecting when pressure within the first chamber reaches approximately the predetermined extension pressure. Furthermore, the method includes increasing pressure in the first chamber above approximately the predetermined extension pressure by moving the intensifying rod at least partially into the first chamber. The method additionally includes monitoring pressure within the first chamber and detecting when pressure within the first chamber reaches approximately a weld pressure. The method also includes welding the part when pressure within the first chamber reaches approximately the weld pressure.

In another aspect, the present invention is a welding device that includes a plurality of welding gun assemblies, each including a housing that defines a first chamber and a second chamber, a first piston moveably disposed in the first chamber, a second piston moveably disposed in the second chamber, and an intensifying rod that can move at least partially into the first chamber due to movement of the second piston within the second chamber. The welding device also includes a controller with a pressure sensor that is operable to detect pressure within each of the first chambers of the plurality of welding assemblies. The controller is operable to increase pressure within each of the first chambers up to approximately a predetermined extension pressure while each of the intensifying rods are disposed outside of the respective one of the first chambers. The controller is further operable to increase pressure within each of the second chambers to thereby move the respective one of the intensifying rods at least partially into the respective one of the first chambers to thereby increase pressure within the first chambers above the predetermined extension pressure.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
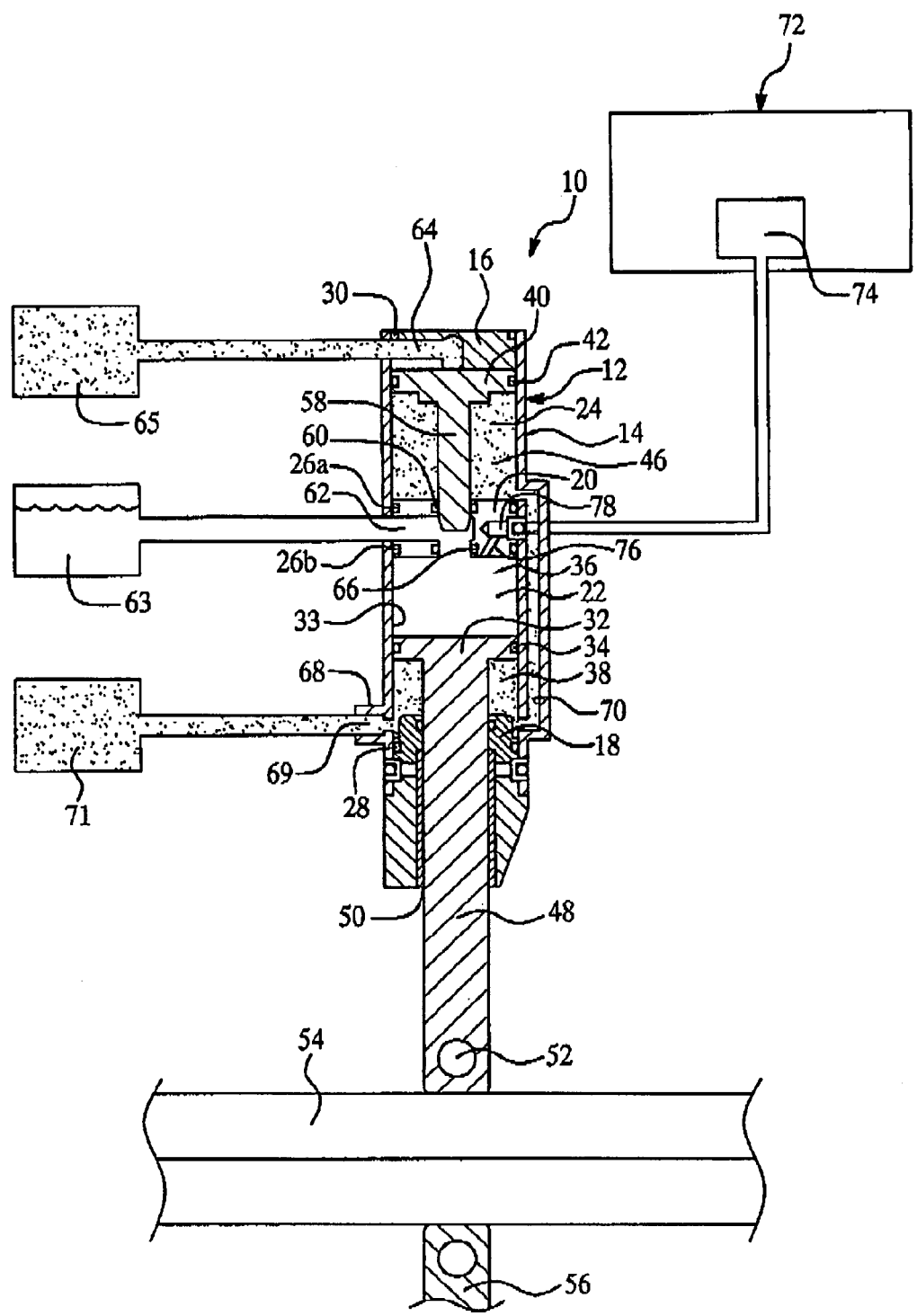
FIG. 1 is a cross sectional view of a welding gun assembly constructed according to the present invention, wherein the welding gun assembly is in an extended configuration.
Figure 2:
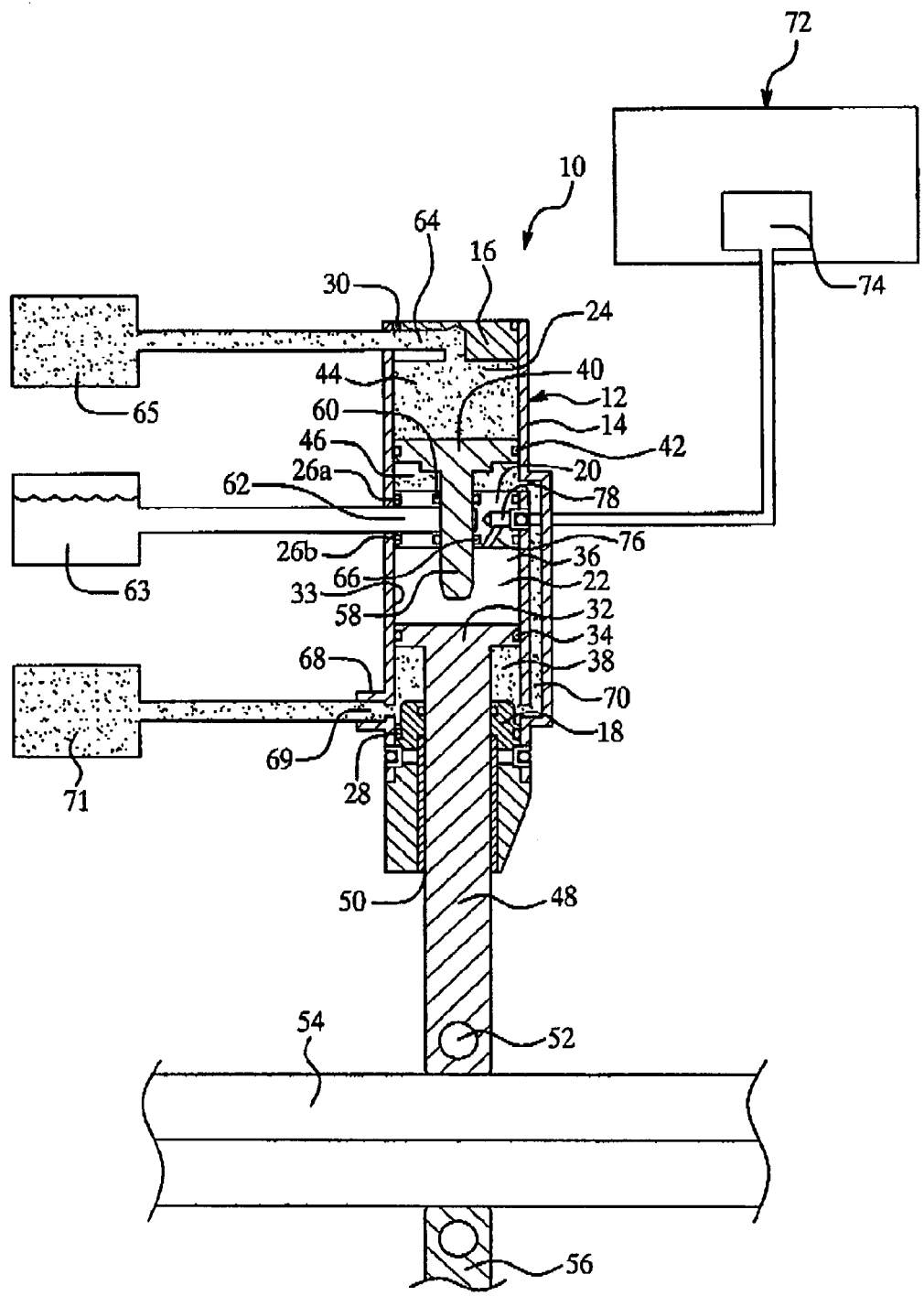
FIG. 2 is a cross sectional view of the welding gun assembly of FIG. 1, wherein the welding gun assembly is applying a weld force to a part.

Referring to FIGS. 1 and 2, one embodiment of a welding gun assembly is generally indicated at 10. The welding gun assembly 10 includes a housing 12. The housing 12 includes an outer wall 14, a top member 16, and a bottom member 18. The top member 16 and the bottom member 18 are disposed at opposite ends of the outer wall 14. The housing 12 also includes an intermediate member 20 disposed inside the outer wall 14 between the top member 16 and the bottom member 18. As such, the housing 12 defines a first chamber 22 between the bottom member 18 and the intermediate member 20. The housing 12 also defines a second chamber 24 between the top member 16 and the intermediate member 20. The intermediate member 20 includes a plurality of outer seals 26a, 26b that fluidly seal the first chamber 22 from the second chamber 24 and vice versa. The bottom member 18 also includes at least one outer seal 28 that fluidly seals the bottom member 18 to the outer wall 14. Furthermore, the top member 16 includes at least one outer seal 30 that creates a fluid seal between the top member 16 and the outer wall 14. It should be appreciated that the housing 12 can be of any suitable shape without departing from the scope of the invention.

The welding gun further includes a first piston 32. The first piston 32 is disk-shaped and is movably disposed in the first chamber 22. More specifically, the first piston 32 radially extends toward the inner surface 33 of the outer wall 14. In the embodiment shown, the first piston 32 includes an outer seal 34 that creates a seal between the first piston 32 and the outer wall 14 of the housing 12. As such, the first piston 32 divides the first chamber 22 into a first pressure chamber 36 and a first return chamber 38. The first pressure chamber 36 is defined between the first piston 32 and the intermediate member 20, and the first return chamber 38 is defined between the first piston and the bottom member 18. It will be appreciated that the first pressure chamber 36 and the first return chamber 38 will each change in volume as the first piston 32 moves within the first chamber 22.

The welding gun assembly 10 further includes a second piston 40. The second piston 40 is substantially disk-shaped in the embodiment shown, and is movably disposed in the second chamber 24. The second piston 40 radially extends toward the outer wall 14 of the housing 12 and includes an outer seal 42 that creates a seal between the second piston 40 and the outer wall 14 of the housing 12. As such, the second piston 40 divides the second chamber 24 into a second pressure chamber 44 (see FIG. 2) and a second return chamber 46. The second pressure chamber 44 is defined between the second piston 40 and the top member 16, and the second return chamber 46 is defined between the second piston 40 and the intermediate member 20 of the housing 12. It will be appreciated that the second pressure chamber 44 and the second return chamber 46 will each change in volume as the second piston 40 moves within the second chamber 24.

The welding gun assembly 10 further includes an extension rod 48. In the embodiment shown, the extension rod 48 is operatively mounted to the first piston 32. The extension rod 48 extends from the first piston 32 through the first return chamber 38, through an aperture 50 formed within the bottom member 18. The extension rod 48 is long enough to extend through the bottom member 18 and out of the housing 12. As will explained in greater detail below, the extension rod 48 moves relative to the housing 12 due to movement of the first piston 32 within the first chamber 22.

The welding gun assembly 10 further includes at least one electrode 52. In the embodiment shown, the electrode 52 is operatively mounted to the extension rod 48. As will be explained in greater detail below, the extension rod 48 can extend out from the housing 12 and contact a part to be welded 54, such as a plurality of metal sheets.

The welding gun assembly 10 further includes an intensifying rod 58. In the embodiment shown, the intensifying rod 58 is operatively mounted to the second piston 40 such that movement of the second piston 40 moves the intensifying rod 58. It should be appreciated, however, that the intensifying rod 58 could be separate and distinct from the second piston 40 without departing from the scope of the invention. In the embodiment shown, the intensifying rod 58 extends from the second piston 40 through the second return chamber 46 and through an aperture 60 formed in the intermediate member 20. The aperture 60 extends axially through the intermediate member 20 such that the intensifying rod is able to at least partially move into the first pressure chamber 36 of the first chamber 22 due to movement of the second piston 40 toward the first chamber 22. As will be explained in greater detail below, the intensifying rod 58 moves into the first pressure chamber 36 in order to increase and maintain pressure within the first chamber 22 such that the extension rod 48 exerts increased pressure on the part to be welded 54.

The welding gun assembly 10 further includes a first port 62 in fluid communication with the first chamber 22. In the embodiment shown, for instance, the first port 62 extends through the outer wall 14 of the housing 12, through the intermediate member 20 and is in fluid communication with the aperture 60 such that the first port 62 is in fluid communication with the first pressure chamber 36. A first fluid 63 can be introduced into the first pressure chamber 36 through the first port 62 as will be explained in greater detail below. The welding gun assembly 10 further includes a second port 64 that is in fluid communication with the second chamber 24. In the embodiment shown, the second port 64 extends through the outer wall 14 of the housing 12, through the top member 16 in order to be in fluid communication with the second pressure chamber 44. As will be explained in greater detail below, a second fluid 65 can be introduced into the second pressure chamber 44 through the second port 64. In one embodiment, the first fluid 63 is in incompressible fluid, such as an oil. In one embodiment, the second fluid 65 is air.

By introducing the first fluid 63 into the first pressure chamber 36, pressure inside the first pressure chamber 36 increases, which in turn moves the first piston 32 and moves the extension rod 48 further outward from the housing 12. By introducing the second fluid 65 into the second pressure chamber 44, pressure inside the second pressure chamber 44 increases, which in turn moves the second piston 40 and the intensifying rod 58 at least partially into the first pressure chamber 36.

In the embodiment shown in FIGS. 1 and 2, the intensifying rod 58 is operable to seal the first port 62 as the intensifying rod 58 moves away from the second chamber 24 and toward the first chamber 22. More specifically, the first port 62 is disposed such that intensifying rod 58 blocks and seals the first port 62 as the intensifying rod 58 moves through the aperture 60 formed in the intermediate member 20. In the embodiment shown, the intermediate member 20 includes a plurality of inner seals 66 disposed within the aperture 60 and operable to create a seal between the intermediate member 20 and the intensifying rod 58.

To operate the welding gun assembly 10 and weld the part 54 assuming the intensifying rod 58 is disposed outside of the first chamber 22, the first fluid 63 is introduced into the first pressure chamber 36 through the first port 62. As a result, pressure inside the first pressure chamber 36 increases and causes the first piston 32 to move toward the bottom member 18. Movement of the first piston 32 causes the extension rod 48 to increasingly extend outward from the housing 12. When the extension rod 48 contacts the part to be welded 54, pressure is applied to the part 54. At this point, the extension rod 48 can be considered fully extended. Typically, the pressure on the part 54 is inadequate to achieve a proper weld; therefore, the second fluid 65 is introduced into the second pressure chamber 44 through the second port 64. As the second fluid 65 is introduced, pressure within the second pressure chamber 44 increases, thereby causing the second piston 40 to move toward the first chamber 22. As a result, the intensifying rod 58 moves through the aperture 60 and at least partially into the first pressure chamber 36, sealing the first port 62 in the process. As the intensifying rod 58 moves into the first pressure chamber 36, pressure inside the first pressure chamber 36 intensifies, thereby causing the extension rod 48 to exert increased pressure on the part 54. An electric current can then be delivered to the part 54 through the electrode 52 to weld the part 54.

Loads on the extension rod 48 at least partially transfer to the part 54. Also, current can flow through the electrode 52 to weld the part 54 as will be explained. In one embodiment, the part 54 is sandwiched between the extension rod 48 and a backing member 56. The extension rod 48, in combination with the backing member 56, impart a pressure on the part 54. For a predetermined time, an electric current is directed through the electrode 52 to thereby weld the part 54. It should be appreciated that the backing member 56 could be of any suitable type. For instance, the backing member 56 is another extension rod that moves in combination with the extension rod 48. In another embodiment, the backing member 56 is a static post. The backing member 56 can be integral to the welding gun assembly 10 or separate from the welding gun assembly 10. It should also be appreciated that the part 54 could be welded in any suitable fashion, such as resistance spot welding, seam welding, flash welding, projection welding, or upset welding.

In the embodiment shown, the welding gun assembly 10 further includes a return port 68. In the embodiment shown, the return port 68 is in fluid communication with the first return chamber 38 and the second return chamber 46. More specifically, the return port 68 includes a first portion 69 which extends through the outer wall 14 of the housing 12 to be in fluid communication with the first return chamber 38. The return port 68 also includes a second portion 70 which extends axially along the housing 12 and is distinct from the first pressure chamber 36. The second portion 70 of the return port 68 is open to each of the second return chamber and the first return chamber 38. As such, in order to return the first and second pistons 32, 40 as well as the extension rod 48 and intensifying rod 58 to the configuration shown in FIG. 1, a return fluid 71 is introduced into the first and second return chambers 38, 46 through the return port 68. This increases pressure in the first and second return chambers 38, 46 and causes the first piston 32 and extension rod 48 to move toward the second chamber 22 and the second piston 40 and intensifying rod 58 away from the first chamber 22 to return to the configuration of FIG. 1. It should be appreciated that the welding gun assembly 10 could include distinct return ports 68 for each of the first and second return chambers 38, 46 without departing from the scope of the invention.

The welding gun assembly 10 further includes a controller 72 schematically illustrated in FIGS. 1 and 2. The controller 72 includes a pressure sensor 74 that is operable to detect pressure within the first pressure chamber 36. For instance, in the embodiment shown, the housing 12 defines a sensing aperture 76. The housing 12 further includes a controller port 78. The controller 72 and, in particular, the pressure sensor 74 can operably and fluidly connect to the welding gun assembly 10 via the controller port 78. The sensing aperture 76 is in fluid communication with both the first pressure chamber 36 and the controller port 78. In the embodiment shown, for instance, the sensing aperture 76 and controller port 78 are formed in the intermediate member 20. The controller 72 and, in particular, the sensor 74 is thus able to directly detect pressure within the first pressure chamber 36 because it is in direct fluid communication with the first pressure chamber 36 through the sensing aperture 76. The controller 72 includes a feedback loop to detect pressure in the first pressure chamber 36 in one embodiment. As such, monitoring of the pressure in the first pressure chamber 36 can occur in real time and with a high degree of accuracy.

Generally speaking, the controller 72 is operable to supply the first fluid 63 into the first pressure chamber 36 to cause the extension rod 48 to extend out of the housing 12 as described above. The controller 72 is further operable to supply the second fluid 65 into the second pressure chamber 44 to cause the intensifying rod 58 to seal the first port and move at least partially into the first pressure chamber 36. More specifically, the controller 72 can be a computer that includes suitable programming to control the introduction of the first fluid 63, second fluid 65 and the return fluid 71 at predetermined times based on the pressure detected within the first pressure chamber 36.

Thus, assuming the intensifying rod 58 is disposed outside of the first pressure chamber 36 as illustrated in FIG. 1, the controller 72 causes the first fluid 63 to be introduced into the first pressure chamber 36. The controller 72 introduces enough of the first fluid 63 to increase pressure within the first pressure chamber 36 up to approximately a predetermined extension pressure. At the predetermined extension pressure, the extension rod 48 is in contact with the part 54, and the part 54 exerts a reaction force on the extension rod 48 to elevate the pressure in the first pressure chamber 36 to the extension pressure. The controller 72 monitors pressure in the first pressure chamber 36 and detects when the extension pressure is reached (i.e., when the extension rod 48 contacts the part 54). Then, the controller 72 causes the introduction of the second fluid 65 into the second pressure chamber 44, which moves the intensifying rod 58 toward the first pressure chamber 36, sealing the first port 62 in the process. As the intensifying rod 58 moves into the first pressure chamber 36, pressure inside the first pressure chamber 36 increases above the extension pressure. The controller 72 increases the pressure within the first pressure chamber 36 in this manner up to a predetermined weld pressure. The predetermined weld pressure is suitable to cause the extension rod 48 to impart a necessary pressure on the part 54 for proper welding. In one embodiment, the controller 72 is operable to maintain the intensifying rod 58 at a constant position within the first pressure chamber 36 to thereby maintain pressure in the first pressure chamber 36 at the weld pressure for a predetermined time. As such, the controller 72 can cause the welding gun assembly 10 to apply adequate weld pressure to the part 54 for a necessary time. The controller 72 is further operable to cause current to travel through the electrode 52 when the weld pressure is reached to thereby weld the part 54.

Figure 3:
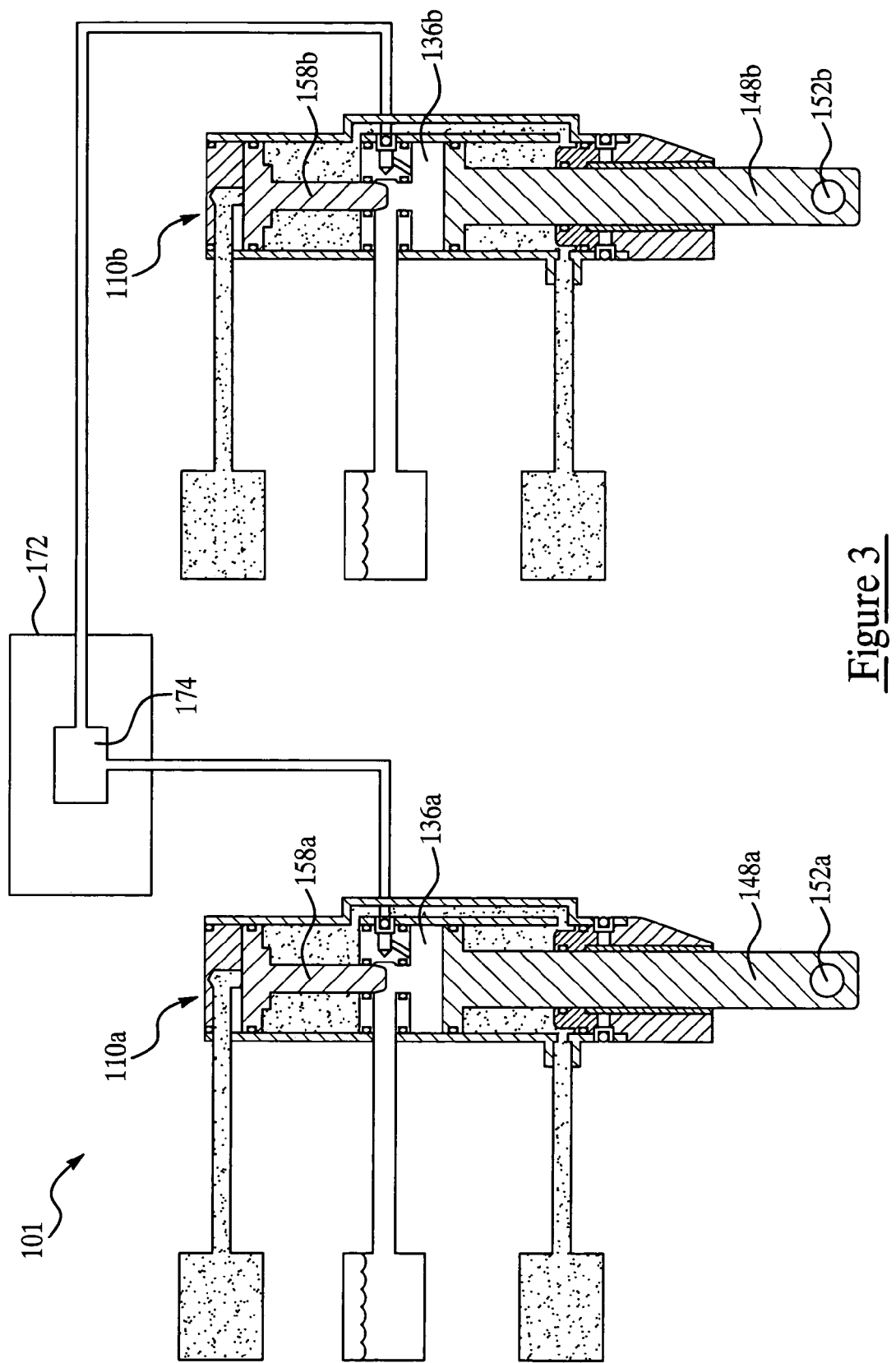
FIG. 3 is a cross sectional view of a plurality of welding gun assemblies interconnected with a common controller.

Turning now to FIG. 3, another embodiment of the present invention is shown, where like numerals increased by 100 are used to designate like structure with respect to the embodiment illustrated in FIGS. 1 and 2. In the embodiment shown in FIG. 3, a welding device 101 is shown which incorporates a plurality of welding gun assemblies 110a, 110b. The welding gun assemblies 110a, 110b are substantially similar to the welding gun assembly 10 described above in relation to FIGS. 1 and 2, and each includes a distinct electrode 152a, 152b, respectively. The welding device 101 of FIG. 3 includes a controller 172 with a pressure sensor 174 that is operable to detect pressure within each of the first pressure chambers 136a, 136b of the welding gun assemblies 110a, 110b. In the embodiment shown, the controller 172 and the pressure sensor 174 is common to each of the welding gun assemblies 110a, 110b. However, it should be appreciated that each of the welding gun assemblies 110a, 110bcould include separate pressure sensors that are in communication with a common controller 172. The controller 172 operates to control movement of the extension rod 148a, 148b and the intensifying rod 158a, 158b in a manner similar to the embodiments described above in relation to FIGS. 1 and 2. It should be appreciated that the welding gun assemblies 110a, 110b can be operated in sync with each other such that multiple welds can be created at the same time. Weld pressure imparted by each of the extension rods 148a, 148b can be similar. The amount of time the pressure is applied can be synchronized as well. The current supplied can also be synchronized. As such, similar welds can be applied at the same time and warping is less likely.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A welding gun assembly comprising:
   a housing that defines a first chamber and a second chamber;
   a first piston moveably disposed in said first chamber so as to divide said first chamber into a first pressure chamber and a first return chamber;
   a second piston moveably disposed in said second chamber;
   an intensifying rod movable at least partially into said first chamber due to movement of said second piston;
   a pressure sensor in fluid communication with only one of the first pressure chamber and the first return chamber to thereby detect pressure therein; and
   a controller operable to change pressure within the first and second chambers based on the pressure detected by the pressure sensor such that the controller increases pressure within said first chamber up to approximately a predetermined extension pressure while said intensifying rod is disposed outside of said first chamber, and such that the controller increases pressure within said second chamber to thereby move said intensifying rod at least partially into said first chamber to thereby increase pressure within said first chamber above the predetermined extension pressure.

2. The welding gun assembly of claim 1, wherein said housing defines a sensing aperture and wherein said sensor of said controller is in fluid communication with said first pressure chamber via said sensing aperture.

3. The welding gun assembly of claim 2, wherein said first pressure chamber is able to receive a fluid which increases the pressure in said first pressure chamber up to approximately the predetermined extension pressure, wherein said intensifying rod is moved at least partially into said first pressure chamber due to movement of said second piston within said second chamber, and wherein said sensing aperture is in fluid communication with said first pressure chamber.

4. The welding gun assembly of claim 1, wherein said controller is further operable to maintain said intensifying rod at least partially disposed within said first chamber to thereby maintain pressure in the first chamber at approximately a weld pressure for a predetermined time.

5. The welding gun assembly of claim 1, further comprising at least one electrode, and wherein said controller is further operable to cause a current to travel through said electrode when pressure in said first chamber reaches approximately a weld pressure.

6. The welding gun assembly of claim 1, further comprising a first port in fluid communication with said first chamber, wherein a fluid can be introduced into said first chamber through said first port, and wherein said intensifying rod is operable to seal said first port as said intensifying rod moves away from said second chamber and toward said first chamber.

7. The welding gun assembly of claim 1, further comprising an extension rod that is operatively coupled to said first piston and that is operable to increasingly extend out of said housing due to movement of said first piston, wherein loads on said extension rod at least partially transfer to a part for welding.

8. The welding gun assembly of claim 1, further comprising a first port in fluid communication with said first chamber, wherein a fluid is introduced into said first chamber through said first port, and still further comprising a second port in fluid communication with said second chamber, wherein a fluid is introduced into said second chamber through said second port, wherein said controller is operable to increase pressure within said first chamber by causing the introduction of said fluid into said first chamber through said first port, and wherein said controller is further operable to increase pressure within said second chamber by causing the introduction of said fluid into said second chamber through said second port.

9. The welding gun assembly of claim 1, wherein said second piston divides said second chamber into a second pressure chamber and a second return chamber, and wherein said controller is operable to increase pressure within said second return chamber to thereby move said intensifying rod away from said first chamber and toward said second chamber.

10. The welding gun assembly of claim 1, wherein said intensifying rod is operatively coupled to said second piston.

11. A method of welding a part with a welding gun assembly comprising a housing that defines a first chamber and a second chamber, a first piston moveably disposed in the first chamber so as to divide the first chamber into a first pressure chamber and a first return chamber, a pressure sensor in fluid communication with only one of the first pressure chamber and the first return chamber to thereby detect pressure therein, a second piston moveably disposed in the second chamber, and an intensifying rod that is moved at least partially into said first chamber due to movement of said second piston within said second chamber, said method comprising the steps of:
   increasing pressure in the first chamber up to approximately a predetermined extension pressure while the intensifying rod is disposed outside the first chamber;

monitoring pressure within the first chamber with the pressure sensor and detecting when pressure within the first chamber reaches approximately the predetermined extension pressure;

increasing pressure in the first chamber above approximately the predetermined extension pressure by moving the intensifying rod at least partially into the first chamber;

monitoring pressure within the first chamber with the pressure sensor and detecting when pressure within the first chamber reaches approximately a weld pressure; and welding the part when the pressure sensor detects that pressure within the first chamber reaches approximately the weld pressure.

12. The method of welding as set forth in claim 11, wherein the housing of the welding gun assembly further includes a sensing aperture in fluid communication with said first pressure chamber for providing fluid communication between the first pressure chamber and the pressure sensor.

13. The method of welding of claim 11, wherein the welding gun assembly further comprises a first port in fluid communication with the first chamber, wherein a fluid is introduced into said first chamber through the first port, said method further comprising the step of:

sealing the first port after the predetermined extension pressure is approximately reached.

14. The method of welding of claim 13, wherein said step of sealing the first port is achieved by the intensifying rod while moving away from the second chamber and toward the first chamber.

15. The method of welding of claim 11, further comprising the step of:

maintaining the pressure in the first chamber at approximately the weld pressure for a predetermined time.

16. The method of welding of claim 11, wherein the second piston divides the second chamber into a second pressure chamber and a second return chamber, said method further comprising the step of:

increasing pressure within the second return chamber to thereby move said intensifying rod away from said first chamber and toward said second chamber after said step of welding the part when pressure within the first chamber reaches approximately the weld pressure.

17. The method of welding of claim 11, wherein the welding gun further comprises an extension rod that is operatively mounted to the first piston and that is operable to increasingly extend out of the housing due to movement of the first piston within the first chamber, wherein loads on the extension rod at least partially transfer to the part.

18. The method of welding of claim 11, wherein the welding gun further comprises a first port in fluid communication with the first chamber, wherein said step of increasing pressure in the first chamber up to approximately a predetermined extension pressure while the intensifying rod is disposed outside the first chamber is achieved by introducing a fluid into the first chamber through the first port.

19. The method of welding of claim 11, wherein the welding gun further comprises a second port in fluid communication with the second chamber, wherein said step of increasing pressure in the first chamber above approximately the predetermined extension pressure by moving the intensifying rod at least partially into the first chamber is achieved by introducing a fluid into the second chamber through the second port.

20. A welding device comprising:

a plurality of welding gun assemblies, each comprising a housing that defines a first chamber and a second chamber, a first piston moveably disposed in said first chamber so as to divide said first chamber into a first pressure chamber and a first return chamber, a second piston moveably disposed in said second chamber, and an intensifying rod movable at least partially into said first chamber due to movement of said second piston;

a pressure sensor that is in fluid communication with only one of the first pressure chamber and the first return chamber of each of the plurality of welding gun assemblies so as to detect pressure therein; and a controller operable to change pressure within the first and second chamber of each of the plurality of welding gun assemblies based on the pressures detected by the pressure sensor such that the controller increases pressure within each of said first chambers up to approximately a predetermined extension pressure while each of said intensifying rods are disposed outside of the respective one of said first chambers, and such that the controller increases pressure within each of said second chambers to thereby move the respective one of said intensifying rods at least partially into the respective one of said first chambers to thereby increase pressure within said first chambers above the predetermined extension pressure.

* * * * *